(12) United States Patent
Splane, Jr.

(10) Patent No.: US 6,742,266 B2
(45) Date of Patent: Jun. 1, 2004

(54) MINIATURE RECIPROCATING SAW DEVICE

(76) Inventor: Robson L. Splane, Jr., 10850 White Oak Ave., Granada Hills, CA (US) 91344

( * ) Notice: Subject to any disclaimer, the term of this patent is extended or adjusted under 35 U.S.C. 154(b) by 136 days.

(21) Appl. No.: 09/969,863

(22) Filed: Oct. 4, 2001

(65) Prior Publication Data

US 2003/0066196 A1 Apr. 10, 2003

(51) Int. Cl.[7] .............................................. B23D 49/10
(52) U.S. Cl. ..................... 30/392; 30/394; 173/114; 74/50
(58) Field of Search ............................ 30/392, 394, 504, 30/507, 277.4, 287, 289, 122, 329, 337, 342, 371; 173/49, 114, 170, 29; 74/50, 49; 83/746, 699.21, 750, 698.71, 821

(56) References Cited

U.S. PATENT DOCUMENTS

| | | | | |
|---|---|---|---|---|
| 1,417,726 A | * | 5/1922 | Geiger | 30/394 |
| 1,763,500 A | * | 6/1930 | Bowen | 30/392 |
| 2,588,477 A | * | 3/1952 | Briggs | 30/392 |
| 2,908,971 A | * | 10/1959 | Thomas | 30/394 |
| 3,270,369 A | * | 9/1966 | Mandell | 452/160 |
| 3,360,021 A | * | 12/1967 | Mejia | 30/375 |
| 3,572,409 A | | 3/1971 | Hoffman | |
| 3,642,002 A | * | 2/1972 | Otterstrom | 606/177 |
| 3,748,738 A | * | 7/1973 | Alexander | 30/394 |
| 3,785,053 A | * | 1/1974 | Michaelson | 30/394 |
| 5,099,705 A | | 3/1992 | Dravnieks | |
| 5,134,777 A | * | 8/1992 | Meyer et al. | 30/392 |
| 5,303,478 A | | 4/1994 | Gugel | |
| 5,388,334 A | * | 2/1995 | Halsey | 30/509 |
| 5,725,058 A | | 3/1998 | Eriksson | |
| 5,832,611 A | | 11/1998 | Schmitz | |
| 5,964,039 A | | 10/1999 | Mizoguchi | |

FOREIGN PATENT DOCUMENTS

JP 63-216622 * 9/1988 .................. 30/392

* cited by examiner

*Primary Examiner*—Boyer D. Ashley
(74) *Attorney, Agent, or Firm*—Larson & Taylor, PLC

(57) ABSTRACT

A small reciprocating saw device is provided which is adapted for one hand operation and which enables delicate sawing or filing work to be carried out. An eccentric drive arrangement includes a motor mounted in a housing at one end of the device and a slender drive rod for the saw blade disposed in a gripping handle connected to the motor housing. Motor control switches are mounted on the motor housing and gripping handle.

14 Claims, 2 Drawing Sheets

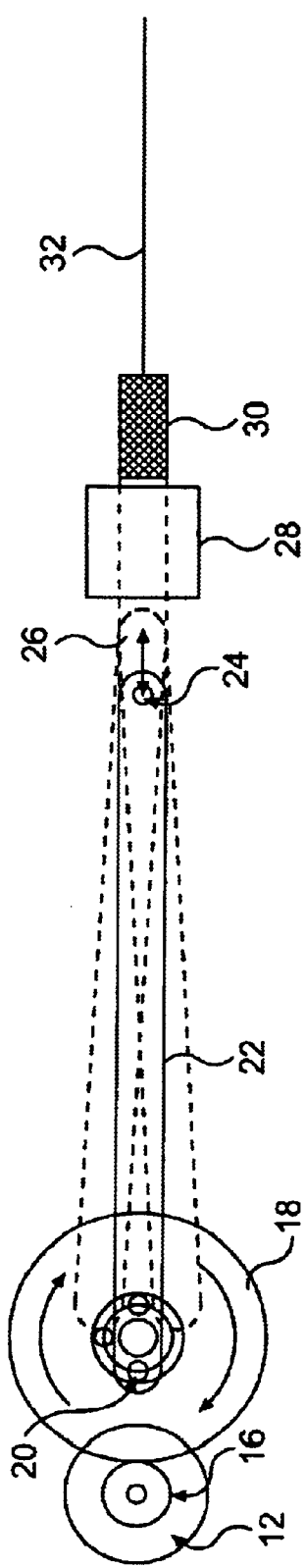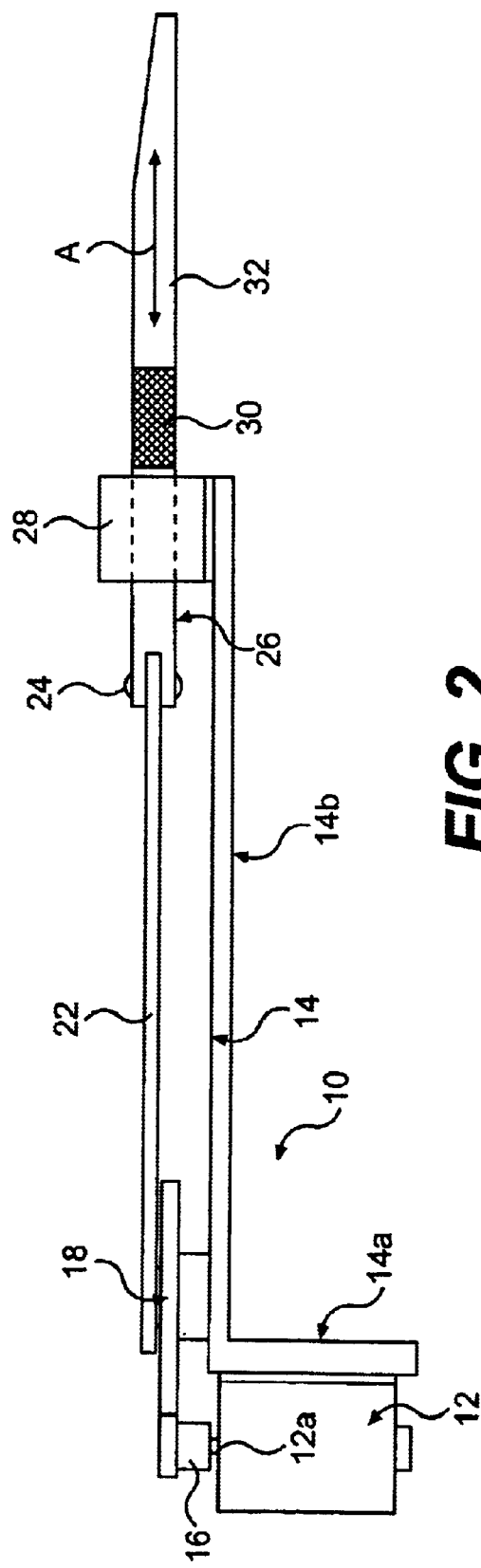

MINIATURE RECIPROCATING SAW DEVICE

FIELD OF THE INVENTION

The present invention relates to reciprocating saws, files and like devices and, more particularly, to an improved device of this type which is substantially reduced in size and which is adapted to permit the device to be held, and readily controlled, by one hand.

BACKGROUND OF THE INVENTION

It is estimated that, in the United States alone, over 100,000 reciprocating saws are sold to the construction trade each year. Although most of these saws are of a relatively large size, saws have been developed which are capable of being held by the hand of a user. Examples of such saws are those disclosed in the following U.S. Pat. No. 5,099,705 (Dravnieks) and U.S. Pat. No. 5,725,058 (Eriksson). The latter discloses a hand-held reciprocating saw device including a housing containing a rotary portion including an oblique shaft and a reciprocating slide driven by the oblique shaft and supporting a saw or file, while the former discloses a hand-held reciprocating saw device comprising a motor unit mounted in a housing along with an eccentric drive connected to a sliding tool unit supporting a sliding saw blade. Other patents of general interest include the following U.S. Pat. No. 5,964,039 (Mizoguchi); U.S. Pat. No. 5,832, 611 (Schmitz); U.S. Pat. No. 5,303,478 (Gugel); and U.S. Pat. No. 3,572,409 (Hoffman).

SUMMARY OF THE INVENTION

In accordance with the invention, a small, i.e., miniaturized, reciprocating tool or tool device is provided which is capable of being comfortably held in one hand and easily controlled with that hand. The tool device can be used to selectively mount tools such as different types of saw blades, files and the like. The device enables delicate work, such as is often required by both professionals and hobbyists, to be carried out, i.e., work of more delicacy than can be performed by standard saws and like tools. As will appear, the device of the invention is constructed so as to permit a user to "choke up" on the handle portion, i.e., grip the handle very close to the distal, working end, and to thus provide excellent control in carrying out delicate sawing and/or filing operations. In addition, the ergonomic construction of the device further contributes to the ease and effectiveness of its use in such tasks.

In accordance with a first aspect of the invention, there is provided a reciprocating tool device for producing reciprocating movement of a tool element received thereby, the device comprising:

a motor including a motor drive shaft;

a gear arrangement driven by the motor drive shaft and including at least one gear, said at least one gear having an axis of rotation and including a drive pin affixed eccentrically thereto with respect to the axis of rotation and extending outwardly from the at least one further gear;

a drive rod coupled to said drive pin and driven thereby responsive to rotation of the at least one gear;

a reciprocating shaft pivotably connected to the drive rod and driven thereby in an axially reciprocating motion along a path;

a tool element holder mounted on the reciprocating shaft for releasably holding a selected tool element;

a housing including a motor housing portion, at one end thereof, for housing the motor, and an elongate housing portion, including a hand gripping portion, connected to motor housing and having a longitudinal axis extending parallel to the path of the reciprocating motion of the shaft, the elongate housing portion housing the drive rod and the gripping portion being of a diameter adapted for gripping by a hand of a user, and the motor housing portion having a longitudinal axis extending substantially orthogonal to the longitudinal axis of the elongate housing portion; and first and second motor control switches mounted on the housing.

Preferably, the first and second motor control switches comprise a first motor control switch mounted on said elongate housing portion and a second motor control switch mounted on said motor housing. Advantageously, the first switch comprises a power control switch mounted on the elongate portion for controlling energizing and de-energizing of the motor; and the second switch comprises a speed control switch mounted on the motor housing for controlling motor speed.

Preferably, the device further comprises a guide means for guiding the movement of the reciprocating shaft. Advantageously, the device further comprises a frame disposed within the housing on which the motor and the guide means are mounted. The frame advantageously comprises a L-shaped frame member.

Preferably the motor housing portion includes a lower leading edge serving as a rest area for resting the device during operation.

Advantageously, the tool element holder comprises an adjustable collet.

According to a further, related aspect of the invention, there is provided a reciprocating tool device for producing reciprocating movement of a working tool element received thereby, the device comprising:

a motor including a motor drive shaft;

a gear arrangement driven by the motor drive shaft and including at least one gear, the at least one gear having an axis of rotation and including a drive pin affixed eccentrically thereto with respect to the axis of rotation and extending outwardly from the at least one further gear;

a drive rod coupled to the drive pin and driven thereby responsive to rotation of the at least one gear;

a reciprocating shaft pivotably connected to the drive rod and driven thereby in an axially reciprocating motion along a path;

a guide means for guiding the movement of the reciprocating shaft;

a tool element holder mounted on the reciprocating shaft for releasably holding a selected tool element;

a motor housing portion located at one end of the device for housing the motor and the gear arrangement;

an elongate housing portion, including a hand gripping portion, connected to motor housing and having a longitudinal axis extending parallel to the path of the reciprocating motion of said shaft, the elongate portion housing the drive rod and the gripping portion being of a diameter adapted for gripping by a hand of a user;

the motor housing having a longitudinal axis extending substantially orthogonal to the longitudinal axis of the elongate housing; and the device further comprising a first motor control switch mounted on the elongate portion and a second motor control switch mounted on the motor housing.

Advantageously, as above, the first switch comprises a power control switch mounted on said elongate portion for controlling energizing and de-energizing of said motor; and the said second switch comprises a speed control switch mounted on said motor housing for controlling motor speed. Preferably, the power control switch is disposed at the distal end of said hand gripping portion. Advantageously, the speed control switch is disposed on top of said motor housing.

In accordance with yet another related aspect of the invention, there is provided a reciprocating tool device for producing reciprocating movement of a working tool element received thereby, the device comprising:

- a L-shaped frame member including a first leg and second leg of greater length than the first leg and extending orthogonally to the first leg;
- a motor affixed to the first leg and including a motor drive shaft;
- a pinion gear driven by the motor drive shaft;
- at least one further gear driven by the pinion gear, said at least one further gear having an axis of rotation and including a drive pin affixed eccentrically thereto with respect to the axis of rotation and extending outwardly from the at least one further gear;
- a drive rod coupled to the drive pin and driven thereby responsive to rotation of the at least one further gear;
- a reciprocating shaft pivotably connected to the drive rod and driven thereby;
- a guide bushing, mounted on the second leg of the frame member at the free end thereof, for guiding the movement of the reciprocating shaft;
- a collet mounted on the reciprocating shaft for releasably holding a selected tool element;
- a motor housing for housing the motor, said pinion gear, the at least one further gear, and the first leg, said motor housing having a longitudinal axis extending parallel to the first leg and including a lower leading edge serving as a rest area for resting the device during operation;
- an elongate housing portion, including a hand gripping portion, connected to the motor housing and extending parallel to the second leg, the elongate portion housing said drive rod and said second leg of said frame member and the gripping portion being of a diameter suitable for gripping by a hand of a user;
- a further, distal cover portion connected to said further housing portion for at least partially shielding the guide bushing and the tool holder;
- a power control switch mounted on the elongate portion for controlling energizing and de-energizing of said motor; and
- a speed control switch mounted on the motor housing for controlling motor speed.

Advantageously, the power control switch is disposed at the distal end of said hand gripping portion and the speed control switch is disposed on top of said motor housing.

Other features and advantages of the present invention will be set forth in, or apparent from, the following detailed description of the preferred embodiments of the invention.

BRIEF DESCRIPTION OF THE DRAWINGS

FIG. 1 is a top plan view of a preferred embodiment of the basic operating mechanism of the reciprocating tool device of the invention;

FIG. 2 is a side elevational view of the mechanism of FIG. 1; and

DESCRIPTION OF THE PREFERRED EMBODIMENTS

Figure 3:
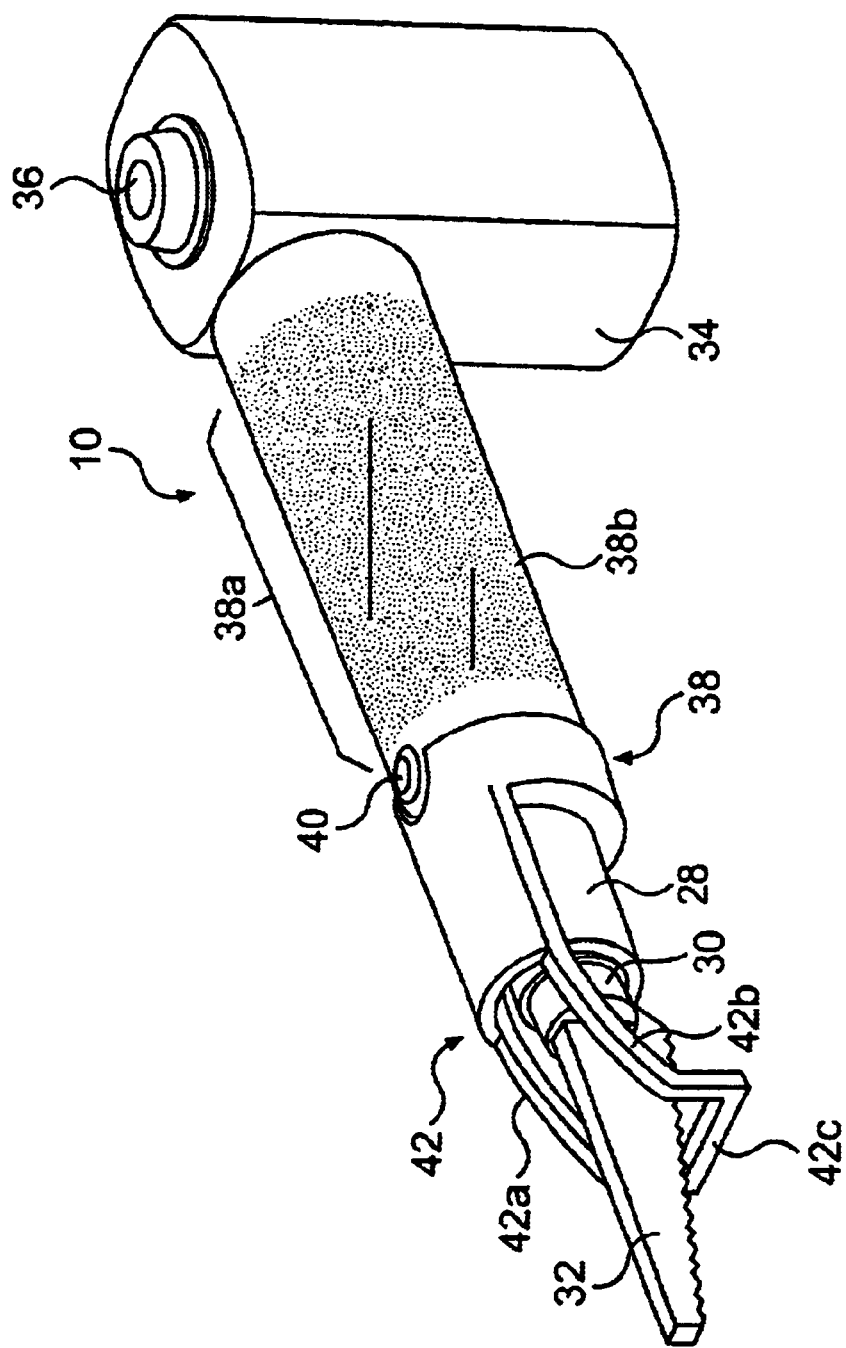
FIG. 3 is a perspective view of an overall device as constructed in accordance with a preferred embodiment of the invention.

Referring to FIGS. 1–3, there is shown a preferred embodiment of the miniature reciprocating saw device of the invention. The basic operating mechanism is shown in FIGS. 1 and 2 while the overall saw device is shown in perspective in FIG. 3 which illustrates some of the ergonomic features of the device. It will be appreciated from the foregoing that while the illustrated device is referred to below as a saw device, the device can be used also with file blades and other like tools.

Turning first to FIGS. 1 and 2, the saw device, which is generally denoted 10, includes a drive motor 12 secured to one leg 14a of a generally L-shaped frame member 14. The motor 12 which can be one of a number of different types and can be battery driven or connected by an electrical cord (not shown) to a standard electrical outlet (not shown).

Motor 12 includes a drive shaft 12a which is connected to, and drives, a pinion gear 16 which, in turn, drives a further gear 18 mounted for rotation on the other leg 14b of frame member 14. A pin 20 is eccentrically mounted on the top of gear 18 and thus rotates around the axis thereof as indicated in dashed lines. It will be understood that other, different gear trains or gearing arrangements can be used to convert the rotation of the motor drive shaft 12a into eccentric motion of pin 20.

Pin 20 is coupled to an elongate thin drive rod 22 so as to produce reciprocating movement of rod 22 in response to rotation of gear 18, as is also indicated in dashed lines in FIG. 1.

Rod 22 is pivotably connected by a pivot pin 24 to a reciprocating shaft 26 received in a guide bushing 28 which is mounted on leg 14b of frame member 14 and which guides the reciprocating motion of shaft 26. Shaft 26 is connected to a collet 30 or like tool holder for holding a saw blade or file member 32. The collet 30 permits different saw blades or file members to be substituted for one another, as desired by the user.

Very briefly considering the operation of device 10, it will be appreciated from the foregoing that rotation of motor drive shaft 12a causes eccentric motion of pin 20 and ultimately produces reciprocation of saw blade 32 (indicated by the double headed arrow A in FIG. 2).

The arrangement of motor 12 at the opposite end of device 10 from blade 32 and the use of an elongate connecting rod 22 to transfer the reciprocating motion to the blade 32 enables the provision of an overall construction for device 10 which is shown in FIG. 3. As illustrated, the device 10 includes a motor housing 34 which extends transversely to the saw blade 32 and in which motor 12 is housed. A speed control button 36 is located on the top of housing 34 and is electrically connected to the control circuit for motor 12 for controlling the speed of motor 12 and thus controlling the reciprocating speed of saw blade 32. Further, motor housing 34 is of a configuration such that the leading or most distal edge of the motor housing 34 can be used as a rest or fulcrum point (or area) during cutting or sawing operations.

The device 10 also includes a further housing portion 38 including an elongate handle or gripping portion indicated at 38a, which may include a knurled surface 38b, as illustrated. A "stop-start" or "off-on" lockable, momentary power switch 40 is located on the top of device 10 at the distal end of housing portion 38 adjacent to gripping portion 38a. Housing portion 38, or at least gripping portion or grip 38a, is preferably made of an elastomeric material which provides additional comfort in use. It will, of course, be appreciated that the device 10 can be gripped, as desired by the user, at any location along housing portion 38, including forwardly of the gripping portion 38a.

The forward or distal end of device 10 includes a curved, generally U-shaped safety bar portion 42. As illustrated, saw blade 32 extends between spaced curved lateral legs 42a and 42b of safety bar 42 and is disposed above a straight connecting portion 42c.

Although it will be appreciated that the following dimensions are merely exemplary, in one advantageous embodiment, the length of drive rod 22 is less than five inches (5"), its width is less than ⅓ inch (0.33") and its spacing from frame member 14 is less than ½ inch (0.5"). Dimensions of this order, in combination with the rear or distal location of the motor 12, enable the hand gripping portion 38a to be made quite small in diameter since housing portion 38 need only provide enough space therewithin to accommodate the slender connecting rod 22. In particular, the gripping portion 38a can be constructed to have a grip diameter which is equal to, or close to, an ideal grip diameter of about 0.875" to 1". Further, the construction of the device 10 enables the user to "choke up" on the housing portion 38, i.e., to hold the device 10 close to cutting end thereof, thereby providing even greater control. This provision of, and the locations of, the speed control switch 36 and the lockable momentary power switch 40 further enhance this control.

It will be appreciated that the small size and one-handed operation described above make possible work in small, confined spaces. The provision of the collet 30 or other similar holding device enables small, replaceable cutting blades to be used which can be employed in more delicate work than is possible with the reciprocating saws currently on the market.

Although the invention has been described above in relation to preferred embodiments thereof, it will be understood by those skilled in the art that variations and modifications can be effected in these preferred embodiments without departing from the scope and spirit of the invention.

What is claimed:

1. A reciprocating tool device for producing reciprocating movement of a tool element received thereby, said device comprising:
    a motor including a motor drive shaft;
    a gear arrangement driven by said motor drive shaft and including at least one gear, said at least one gear having an axis of rotation and including a drive pin affixed eccentrically thereto with respect to said axis of rotation and extending outwardly from said at least one gear;
    a drive rod coupled to said drive pin and driven thereby responsive to rotation of said at least one gear;
    a reciprocating shaft pivotably connected to said drive rod and driven thereby in an axially reciprocating motion along a path;
    a tool element holder mounted on said reciprocating shaft for releasably holding a selected tool element;
    a housing including a motor housing portion, at one end thereof, for housing said motor, and an elongate housing portion, including a hand gripping portion, connected to motor housing portion and having a longitudinal axis extending parallel to the path of the reciprocating motion of said reciprocating shaft, said elongate housing portion housing said drive rod and said gripping portion being of a diameter adapted for gripping by a hand of a user, said motor housing portion having a longitudinal axis extending substantially orthogonal to the longitudinal axis of the elongate housing portion; and
    first and second motor control switches mounted on said housing,
    said device further comprising a guide means for guiding the movement of said reciprocating shaft, and a frame disposed within said housing on which said motor and said guide means are mounted, said frame comprising a L-shaped frame member.

2. A device as claimed in claim 1 which said motor housing portion includes a lower leading edge serving as a rest area for resting the device during operation.

3. A device as claimed in claim 1 wherein said tool element holder comprises an adjustable collet.

4. A device as claimed in claim 1 which said motor housing portion includes a lower leading edge serving as a rest area for resting the device during operation.

5. A device as claimed in claim 1 wherein said first and second motor control switches comprise a first motor control switch mounted on said elongate housing portion and a second motor control switch mounted on said motor housing portion.

6. A device as claimed in claim 5 wherein said first switch comprises a power control switch mounted on said elongate housing portion for controlling energizing and de-energizing of said motor; and wherein said second switch comprises a speed control switch mounted on said motor housing portion for controlling motor speed.

7. A device as claimed in claim 5 which said motor housing portion includes a lower leading edge serving as a rest area for resting the device during operation.

8. A reciprocating tool device for producing reciprocating movement of a working tool element received thereby, said device comprising:
    an L-shaped frame member having a first and a second leg;
    a motor affixed to the first leg and including a motor drive shaft;
    a gear arrangement driven by said motor drive shaft and including at least one gear, said at least one gear having an axis of rotation and including a drive pin affixed eccentrically thereto with respect to said axis of rotation and extending outwardly from said at least one gear;
    a drive rod coupled to said drive pin and driven thereby responsive to rotation of said at least one gear;
    a reciprocating shaft pivotably connected to said drive rod and driven thereby in an axially reciprocating motion along a path;
    a guide means mounted on said second leg for guiding the movement of said reciprocating shaft;
    a tool element holder mounted on said reciprocating shaft for releasably holding a selected tool element;
    a motor housing portion located at one end of said device for housing said motor and said gear arrangement;
    an elongate housing portion, including a hand gripping portion, connected to motor housing and having a longitudinal axis extending parallel to the path of the reciprocating motion of said reciprocating shaft, said elongate portion housing said drive rod and said gripping portion being of a diameter adapted for gripping by a hand of a user;

said motor housing having a longitudinal axis extending substantially orthogonal to the longitudinal axis of the elongate housing; and said device further comprising a first motor control switch mounted on said elongate housing portion and a second motor control switch mounted on said motor housing portion.

9. A device as claimed in claim 8 wherein said first switch comprises a power control switch mounted on said elongate housing portion for controlling energizing and de-energizing of said motor; and wherein said second switch comprises a speed control switch mounted on said motor housing portion for controlling motor speed.

10. A device as claimed in claim 9 wherein said power control switch is disposed at the distal end of said hand gripping portion.

11. A device as claimed in claim 9 wherein said speed control switch is disposed on top of said motor housing.

12. A reciprocating tool device for producing reciprocating movement of a working tool element received thereby, said device comprising:

a L-shaped frame member including a first leg and second leg of greater length than the first leg and extending orthogonally to the first leg;

a motor affixed to the first leg and including a motor drive shaft;

a pinion gear driven by said motor drive shaft;

at least one further gear driven by said pinion gear, said at least one further gear having an axis of rotation and including a drive pin affixed eccentrically thereto with respect to said axis of rotation and extending outwardly from said at least one further gear;

a drive rod coupled to said drive pin and driven thereby responsive to rotation of said at least one further gear;

a reciprocating shaft pivotably connected to said drive rod and driven thereby;

a guide bushing, mounted on said second leg of the frame member at the free end thereof, for guiding the movement of said reciprocating shaft;

a collet mounted on said reciprocating shaft for releasably holding a selected tool element;

a motor housing for housing said motor, said pinion gear, said at least one further gear, and said first leg, said motor housing having a longitudinal axis extending parallel to said first leg and including a lower leading edge serving as a rest area for resting the device during operation;

an elongate housing portion, including a hand gripping portion, connected to motor housing and extending parallel to said second leg, said elongate housing portion housing said drive rod and said second leg of said frame member and said gripping portion being of a diameter suitable for gripping by a hand of a user;

a further, distal cover portion connected to said elongate housing portion for at least partially shielding said guide bushing and said tool holder;

a power control switch mounted on said elongate housing portion for controlling energizing and de-energizing of said motor; and a speed control switch mounted on said motor housing for controlling motor speed.

13. A device as claimed in claim 12 wherein said power control switch is disposed at the distal end of said hand gripping portion.

14. A device as claimed in claim 12 wherein said speed control switch is disposed on top of said motor housing.

* * * * *